(12) United States Patent
Richardson et al.

(10) Patent No.: US 7,590,156 B1
(45) Date of Patent: Sep. 15, 2009

(54) HIGH INTENSITY MHZ MODE-LOCKED LASER

(75) Inventors: Martin Richardson, Geneva, FL (US); Arnaud Zoubir, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 262 days.

(21) Appl. No.: 11/130,692

(22) Filed: May 17, 2005

Related U.S. Application Data

(60) Provisional application No. 60/571,907, filed on May 17, 2004.

(51) Int. Cl.
*H01S 3/098* (2006.01)

(52) U.S. Cl. .............. 372/18; 372/11; 372/25; 372/44.01; 372/93; 372/98

(58) Field of Classification Search .......... 372/18, 372/11, 25, 44.01, 93, 98
See application file for complete search history.

(56) References Cited

U.S. PATENT DOCUMENTS

| | | | |
|---|---|---|---|
| 4,727,553 A | 2/1988 | Fork et al. | 372/25 |
| 4,872,179 A * | 10/1989 | Nitsche et al. | 372/93 |
| 5,146,368 A * | 9/1992 | Fink | 359/861 |
| 5,237,577 A | 8/1993 | Keller et al. | 372/11 |
| 5,278,855 A | 1/1994 | Jacobovitz-Veselka et al. | 372/44 |
| 5,291,265 A | 3/1994 | Kebabian | 356/246 |
| 5,392,310 A * | 2/1995 | Klein | 372/95 |
| 5,734,503 A | 3/1998 | Szipócs et al. | 359/584 |
| 5,812,308 A | 9/1998 | Kafka et al. | 359/346 |
| 5,867,329 A * | 2/1999 | Justus et al. | 359/861 |
| 6,038,055 A * | 3/2000 | Hansch et al. | 359/279 |
| 6,055,261 A | 4/2000 | Reed et al. | 372/93 |
| 6,141,359 A | 10/2000 | Cunningham et al. | 372/18 |
| 6,188,475 B1 | 2/2001 | Inman et al. | 356/246 |
| 6,393,035 B1 | 5/2002 | Weingarten et al. | 372/18 |
| 6,538,298 B1 | 3/2003 | Weingarten et al. | 257/436 |
| 6,697,408 B2 * | 2/2004 | Kennedy et al. | 372/55 |
| 6,834,064 B1 * | 12/2004 | Paschotta et al. | 372/30 |
| 7,016,107 B2 * | 3/2006 | Kafka et al. | 359/348 |
| 2003/0189959 A1 * | 10/2003 | Erbert et al. | 372/25 |

OTHER PUBLICATIONS

E. B. Kim, et al., "Phase-stabilized Optical Frequency Synthesizer With a Femtosecond Mode-Locked Laser", Apr. 22, 2004, p. 1, Center for Optical Frequency Control, Korea Research Institute of Standards and Science, http://sols,kaeri,re.kr/documents/P-8.htm.

(Continued)

*Primary Examiner*—Minsun Harvey
*Assistant Examiner*—Kinam Park
(74) *Attorney, Agent, or Firm*—Brian S. Steinberger; Phyllis K. Wood; Law Offices of Brian S. Steinberger, P.A.

(57) ABSTRACT

Systems, configurations and methods of using an ultrafast, self-starting, mode-locked laser are provided. The systems, devices and methods of using stable, self-starting mode-locked lasers, can be compact, use fewer optical elements and have energies sufficient for most micro-processing and micro-structuring applications. The large spectral bandwidth of ultra-short (femtosecond) laser pulses can be used in laser sensing applications, micro-machining, time-resolved experiments, where short-lived transient species can be observed in biological or chemical reactions. Terahertz radiation can be generated using ultrashort pulses and used for imaging applications.

15 Claims, 6 Drawing Sheets

OTHER PUBLICATIONS

A. Zoubir, et al., Practical Uses of Femtosecond Laser Micro-materials Processing, (2003), Appl. Phys. A 77, pp. 311-315.

Jae Hee Sung, et al., "13-fs, 1-MW Ti:Sapphire Laser Oscillator in a Long-Cavity Configuration", Jpn. J. Appl. Phys. vol. 41 (2002), pp. L931-L934.

S. H. Cho, et al., "Generation of 90-nJ pulses with a 4-MHz repetition-rate Kerr-lens mode-locked $Ti:Al_2O_3$ laser operating with net positive and negative intracavity dispersion", Optics Letters, vol. 26, No. 8, Apr. 15, 2001, pp. 560-562.

F. Abdullaev, et al., "Disintegration of a soliton in a dispersion-managed optical communication line with random parameters", Optics Letters, vol. 25, No. 2, Jan. 15, 2000, pp. 93-95.

V. Shcheslavskiy, et al., "High-energy self-starting femtosecon $Cr^{4+}:Mg_2SiO_4$ oscillator operating at a low repetition rate", Optics Letters, vol. 26, No. 24, Dec. 15, 2001, pp. 1999-2001.

S. H. Cho, et al., "Low repetition-rate high-peak-power Kerr-lens mode-locked $Ti:Al_2O_3$ laser with a multiple-pass cavity", Optics Letters, vol. 24, No. 6, Mar. 15, 1999, pp. 417-419.

Maxim Pshenichnikov, et al., Generation of 13-fs, 5-MW pulses from a cavity-dumped Ti:sapphire laser, Optics Letters, vol. 19, No. 8, Apr. 15, 1994, pp. 572-574.

* cited by examiner

HIGH INTENSITY MHZ MODE-LOCKED LASER

This invention claims the benefit of priority based on the U.S. Provisional Application Ser. No. 60/571,907 filed May 17, 2004, the contents of which are incorporated herein by reference.

FIELD OF THE INVENTION

This invention relates to ultrafast mode-locked lasers generating pulses with picosecond or less in duration, and, more particularly to systems, devices and methods of using stable, self-starting mode-locked lasers, which are compact, use fewer optical elements and have energies sufficient for most micro-processing and micro-structuring applications.

BACKGROUND AND PRIOR ART

Extremely short duration optical pulses, which are also known as femtosecond pulses, are important for high speed signal processing, communications, micro-machining, imaging, sensing applications, time resolved experiments, where short-lived transient species can be observed in biological and chemical reactions.

The early development of laser technology involving the production of extremely short pulses is disclosed in U.S. Pat. No. 4,727,553 to Fork et al. The early version of a passively mode-locked laser is described as containing a saturable absorbing element optically coupled to a gain medium in an optical resonator. Additional variations of the saturable absorbing element positioned between reflective (mirror-like) elements are disclosed in U.S. Pat. No. 5,237,577 to Keller et al. and U.S. Pat. No. 5,278,855 to Jacobovitz-Veselka et al. The so-called Semiconductor Saturable Absorber Mirrors (SESAMs) are described in U.S. Pat. Nos. 6,538,298 B1 and 6,393,035 B1 to Weingarten et al. The saturable absorber element functions as a shutter.

Further development of passively mode-locked lasers includes use of astigmatic mirrors with spacing and a unique twist angle to correct the optical path in an absorption cell (U.S. Pat. No. 5,291,265 to Kebabian) and subsequently, the integration of the saturable absorber with the optical element as discussed below.

Current conventional, commercial, ultrafast mode-locked lasers have basic constituents, which include an active laser medium, resonator mirrors, and optical components, usually prisms that compensate for dispersion in the resonator. The mode-locking element in simpler devices is a nonlinear optical effect occurring in the laser medium itself. A typical mode-locked laser design is shown in FIG. 1; the laser of this design has drawbacks in that it is not "self-starting" and is sensitive to effects of alignment, optical pumping, and the like.

More recently, other components have been added to the general structure shown in FIG. 1. Instead of using prisms as the dispersive elements, special mirrors, known as, Chirped Mirrors have been developed. Chirped Mirrors or Negative Group Velocity Dispersion (NGVD) as discussed in U.S. Pat. No. 6,055,261 to Reed et al. have been used to provide an ultrafast laser device with a significantly shortened resonant cavity. Additional prism replacements include a fold mirror (U.S. Pat. No. 5,812,308 to Kafka et al.); a dispersive dielectric mirror (U.S. Pat. No. 5,734,503 to Szipocs et al.); a self-tuning saturable reflector comprising two Bragg reflectors (U.S. Pat. No. 6,141,359 to Cunningham et al.); and heated mirrors (U.S. Pat. No. 6,188,475 to Inman et al.) in semiconductor processing.

The prior art includes several arrangements of gain elements, optical components, resonator mirrors, and mode-locking elements for short pulse lasers; however, all arrangements are unlike the arrangements of elements in the present invention. FIG. 1 shows the basic architecture for a short pulse laser, a high reflector (HR) mirror 10, Kerr-lens lasing element 20, dispersion compensating elements, such as, a prism pair 30 and an output coupler (OC) 40. In such lasers, the Kerr-lens effect in the gain medium is the mode-locking mechanism. This configuration is a simpler device that is not "self-starting" and is sensitive to effects of alignment, optical pumping, and the like. FIG. 2 shows the substitution of a saturable absorber mirror 50 for the Kerr-lens mirror 20 (in FIG. 1), a lasing element 60 and Chirped mirrors 70, as the dispersion compensating element, with output coupler 80 to provide a laser that is more stable and "self-starting."

FIG. 3 is another prior art arrangement of a mode-locked laser with a high reflector (HR) 90, a multipass cell 92, a Kerr-lens lasing element 94, a prism pair 96 as the dispersion compensating element with output coupler 98. The multipass cell 92 is added to slow down the repetition rate.

None of the prior art arrangements of gain elements, or optical elements have the addition of Chirped Mirrors (CP), multi-pass mirror system and Saturable Absorber Mirror (SAM) mode-locking elements as disclosed herein. A second embodiment of the invention includes a cavity-dumping feature in the novel arrangement of elements. The cavity-dumping feature facilitates the extraction of all energy trapped inside the cavity by dumping the beam and thereby providing a several-fold improvement in the usable pulse energy. The present invention has a unique configuration and meets the commercial need for rugged, low cost, high power, ultra-short pulse lasers useful in, but not limited to, micro-processing and micro-structuring below conventional tolerances.

SUMMARY OF THE INVENTION

It is a primary objective of the present invention to provide a family of low cost, compact, high peak power ultra-short pulse lasers.

A second objective of the present invention is to provide an ultrafast megahertz (MHz) mode-locked laser of increased ruggedness that is self-starting.

A third objective of the present invention is to provide high intensity MHz mode-locked lasers that are low cost and easy to manufacture.

A fourth objective of the present invention is to provide high repetition rate MHz mode-locked lasers for sub-100 µm micro-processing and micro-structuring.

A fifth objective of the present invention is to provide a mode-locked ultrafast laser with a cavity-dumping feature.

A preferred compact, high intensity megahertz (MHz) mode-locked laser is provided wherein the laser system includes, a laser source coupled to a resonator cavity having a gain medium, a saturable absorber mirror in the resonator cavity for self-starting and stable mode-locking operation, a multipass mirror in combination with the saturable absorber mirror in the resonator cavity for lowering repetition rate of the laser system to below approximately 50 megahertz (MHz), dispersion compensating element in the resonator cavity for dispersion compensation, and an output coupler to the laser for releasing pulses with energies sufficient for micro-machining and micro-structuring applications.

The preferred laser source includes a diode laser. The preferred multi-pass mirror slows down the repetition rate of laser pulses to between approximately 1 MHz to approximately 50 MHz.

The preferred gain medium includes, but is not limited to, Yb:KYW, a KY[WO$_4$]$_2$ (KYW) crystal doped with Ytterbium ions, Yb:YAG, a Y$_3$Al$_5$O$_{12}$ (YAG) crystal doped with Ytterbium ions, and Ti:Sapphire, a sapphire (Al$_2$O$_3$) crystal doped with Titanium ions.

A cavity dumping component is used to extracting energy trapped inside of the resonant cavity. Thus, a more preferred laser system of the present invention includes a cavity dumping component having an optical gate located between the output coupler and the saturable absorber mirror. The preferred cavity dumping component is either an acousto-optically driven gate or an electro-optically driven gate.

A preferred method of improving the pulse energy of a compact, high intensity megahertz mode-locked laser includes, providing a resonant laser cavity having a saturable absorber mirror and a laser gain medium, positioning a cavity dumping component within the laser cavity between an output coupler and the saturable absorber, pumping the laser gain medium, and extracting energy trapped inside the cavity by dumping excess energy through an optical gate, which can be acousto-optically driven or electro-optically driven. The saturable absorber mirror is a broadband saturable absorber.

Another preferred method of providing low cost, simple, compact, ultrafast laser with high pulse energies for micro-machining applications includes, providing a laser configuration having a laser gain medium, a resonator cavity, a saturable absorber mirror, a multipass mirror and an output coupler, pumping the laser gain medium, generating femtosecond pulses with intensities in the megawatt range from the laser source, and simultaneously lowering the repetition rate of each pulse, thereby minimizing damage associated with the thermal load accumulated pulse after pulse. The femtosecond pulses have an energy of between approximately 10 nano Joules (nJ) and approximately 150 nano Joules (nJ). The repetition rate of the femtosecond pulses is in a range between approximately 1 MegaHertz (MHz) and approximately 50 MegaHertz (MHz).

Another preferred high intensity megahertz (MHz) mode-locked laser system has a laser that includes, a laser source and a gain medium, a saturable absorber mirror in the system for self-starting and stable mode-locking operation, a multipass mirror in the laser system for lowering repetition rate of the laser system to below approximately 50 megahertz (MHz), a dispersion compensating element in the laser system for dispersion compensation, and an output coupler to the laser system for releasing pulses with energies sufficient for micro-machining and micro-structuring applications. The preferred gain medium is a Ti:Sapphire crystal, or a thin disk-shaped gain medium.

A preferred basic laser system includes a lasing element, dispersion compensating elements coupled to the lasing element, a SAM mode-locking element coupled to the dispersion compensating element, a multipass mirror system coupled to the SAM mode-locking element, and an output coupler coupled to the multipass mirror system for providing an output from the laser system.

A more preferred laser system includes a lasing element, dispersion compensating elements coupled to the lasing element, a SAM mode-locking element coupled to the dispersion compensating element, a multipass mirror system coupled to the SAM mode-locking element, a cavity dumper coupled to the multipass mirror system, and an output coupler coupled to the cavity dumper for providing an output from the laser system.

Preferred embodiments of the invention include a cavity-dumping feature to extract all the energy trapped inside the cavity by dumping the beam, using an optical gate that can be either acousto-optically or electro-optically driven. The preferred embodiments provide a several-fold improvement in the usable pulse energy; approximately one order of magnitude higher pulse energies than current mode-locked lasers.

Further objects and advantages of this invention will be apparent from the following detailed description of the presently preferred embodiments, which are illustrated schematically in the accompanying drawings.

DESCRIPTION OF THE PREFERRED EMBODIMENTS

Before explaining the disclosed embodiments of the present invention in detail, it is to be understood that the invention is not limited in its application to the details of the particular arrangements shown since the invention is capable of further embodiments. Also, the terminology used herein is for the purpose of description and not of limitation.

Acronyms and terminology used throughout this description are defined as follows:

CM—Chirped mirrors that are able to provide second- and third-order dispersion compensation using a scheme where each frequency component is reflected at different depths through the dielectric coating, which consists of multiple stacks of varying thickness. Chirped mirrors provide very robust and compact arrangements for the design of ultrafast lasers.

FL—focusing lens used to focus the pump beam inside the laser crystal

KLM—Kerr lens mode-locking

MHz—megahertz

MPC—Multipass Cell—a cell inserted inside the laser cavity that enables the repetition rate to be reduced to as low as a few MHz, maintaining a reasonable level of compactness of the laser chassis. The pulse energy, inversely proportional to the repetition rate, is therefore increased several fold, while avoiding damage problems, heating effect, recovery time artifacts associated with high (>50 MHz) repetition rates.

OC—Output Coupler—allows parts of the light trapped inside the cavity to get out HR—High Reflector—constitutes the other end of the cavity opposite the output coupler (OC)

SAM—Saturable Absorber Mirror is a mode-locking element that allows a stabilized pulsed operation and makes the laser self-starting without the need for mechanical adjustments.

SM—Spherical mirror—mirror having a reflecting surface of spherical shape as opposed to a flat mirror. Concave spherical mirrors are used to focus light at the same time it is reflected.

TM—Turning mirror—used to redirect the laser beam

Figure 1:
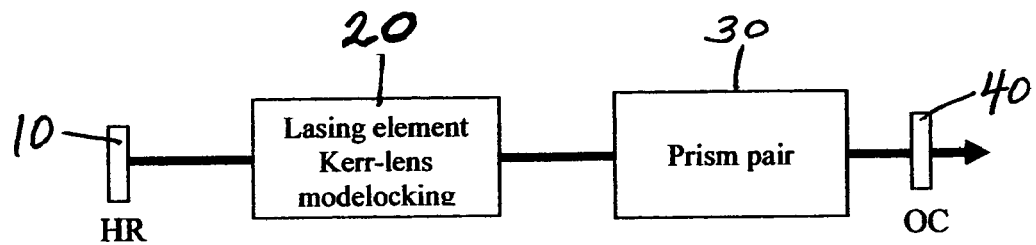
FIG. 1 is a conventional mode-locked laser configuration with Kerr-lens mode locking and a prism pair as the dispersion compensating element. (Prior Art)
Figure 2:
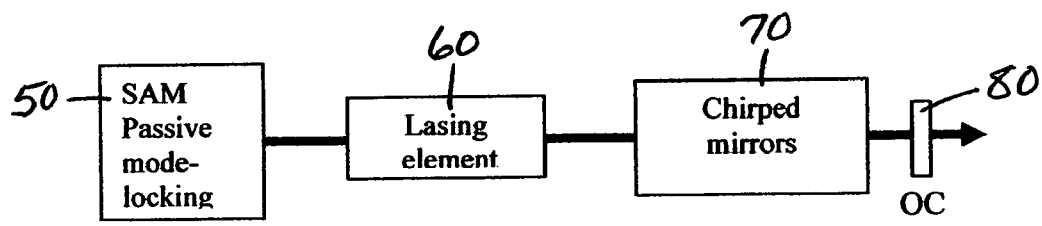
FIG. 2 is a mode locked laser with the addition of Chirped mirrors, as the dispersion compensating element, and Saturable Absorber (SAM) mode-locking element. (Prior Art)

Yb:KYW—gain material consisting of a $KY[WO_4]_2$ (KYW) crystal doped with Ytterbium ions Yb:YAG—gain material consisting of $Y_3Al_5O_{12}$ (YAG) crystal doped with Ytterbium ions Ti:Sapphire—gain material consisting of a sapphire ($Al_2O_3$) crystal doped with Titanium ions More recently other components have been added to this general structure previously described in reference to FIG. 1. Instead of using prisms, dispersive elements, special mirrors, such as, Chirped Mirrors have been developed. These make the system more stable, and reduce the overall footprint of the laser. Moreover a special nonlinear mirror 50 has been developed to replace one of the mirrors (HR) as shown in FIG. 2. The function of the replacement mirror is to act as a "saturable absorber" mode-locking element, replacing, in part, the nonlinear effect in the laser medium. Thus, FIG. 2 is a mode locked laser with the addition of Chirped mirrors 70 and Saturable Absorber (SAM) mode-locking element 50 wherein the substitution of a saturable absorber mirror for the Kerr-lens mirror provides a laser that is more stable and "self-starting."

Figure 3:
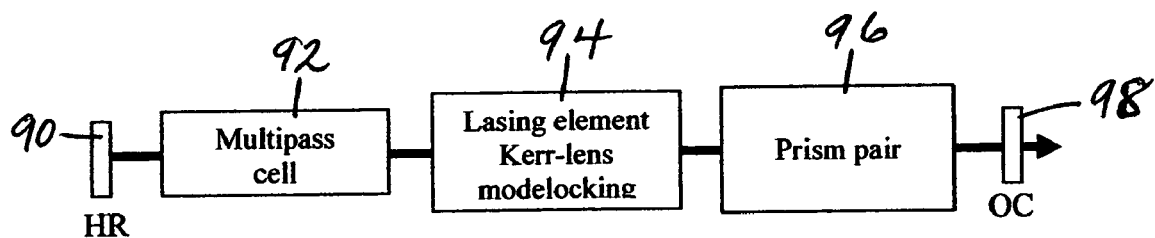
FIG. 3 is a mode-locked laser with Kerr-lens mode locking and a prism pair as the dispersion compensating element and the addition of Multipass mirrors. (Prior Art)

FIG. 3 represents further advancement as a mode-locked laser configuration with Kerr-lens mode locking element 94 and the addition of Multipass mirrors 92 to slow down frequency. FIG. 3 shows the use of a multi-pass mirror system 92 with the conventional non-self-starting Kerr lens mode-locking 94 in the laser medium. This arrangement slows down the laser repetition rate to approximately 4 megahertz (MHz); which is more desirable for micro-machining and microstructuring. To understand this modification, two facts important to commercial applications should be appreciated. Firstly, most of these lasers operate at frequencies around 100 MHz. Thus, individual pulses are separated by approximately 10 nanoseconds (ns). This is too short a time for nearly all processing applications. Secondly, the energy per pulse of these systems is typically a few nanoJoules (nJ), approximately 1 to approximately 3 nJ, too low for most applications. This has lead many groups, including commercial companies, to add complex and expensive amplifier systems to boost the energy.

The present invention recognizes that if the resonator length of the laser increases, the frequency decreases, and the pulse energy increases. The only trouble is that the cavity length must be increased by orders of magnitude, from typically 1 meter (m) overall to greater than approximately 100 meters, for many applications. To accomplish this in a convenient way, the present invention has incorporated a special multi-pass mirror system in combination with CP mirrors, in addition to, utilizing non-self starting Kerr-lens mode locking in the laser medium, as shown in FIG. 3.

According to the present invention, the above objectives are met by incorporation of special Saturable Absorber (SAM) mirrors with mode-locking elements in combination with a Multipass Mirror system to slow down the repetition rate, and create a system that is more stable, self-starting and commercially viable for micro-machining applications.

Figure 4:
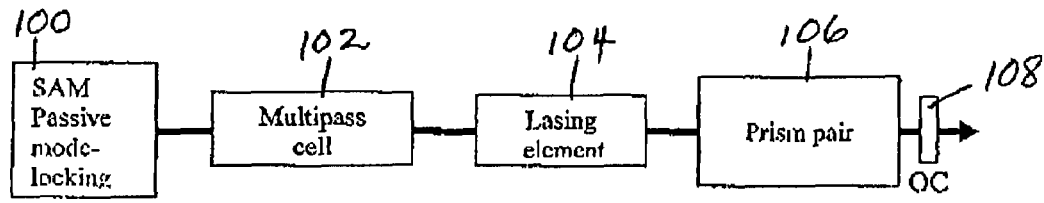
FIG. 4 is a mode-locked laser of the present invention with a special Saturable Absorber Mirror as the mode-locking element, Chirped mirrors as the dispersion compensating element, and Multipass mirrors.

FIG. 4 is a mode-locked laser of the present invention with special Saturable Absorber mode-locking element 100 and Multipass mirrors 102. Referring now to FIG. 4, this is a general layout of the components in the high intensity MHz mode-locked laser of the present invention. A saturable absorber mirror 100 is positioned in close proximity to the multi-pass mirror system 102 and plays the role of both the high reflector and the mode-locking element. The new laser can include a lasing element 104, dispersion compensating elements 106 coupled to the lasing element, and an output coupler 108 to provide output from the laser system.

The order of the elements can vary; for example, a SAM mode-locking element 100 can be coupled to the dispersion compensating element 106, a multipass mirror system 102 can be coupled to the SAM mode-locking element 100 and an output coupler 108 can be coupled to the multipass mirror system 102 for providing an output from the laser system.

Figure 5:
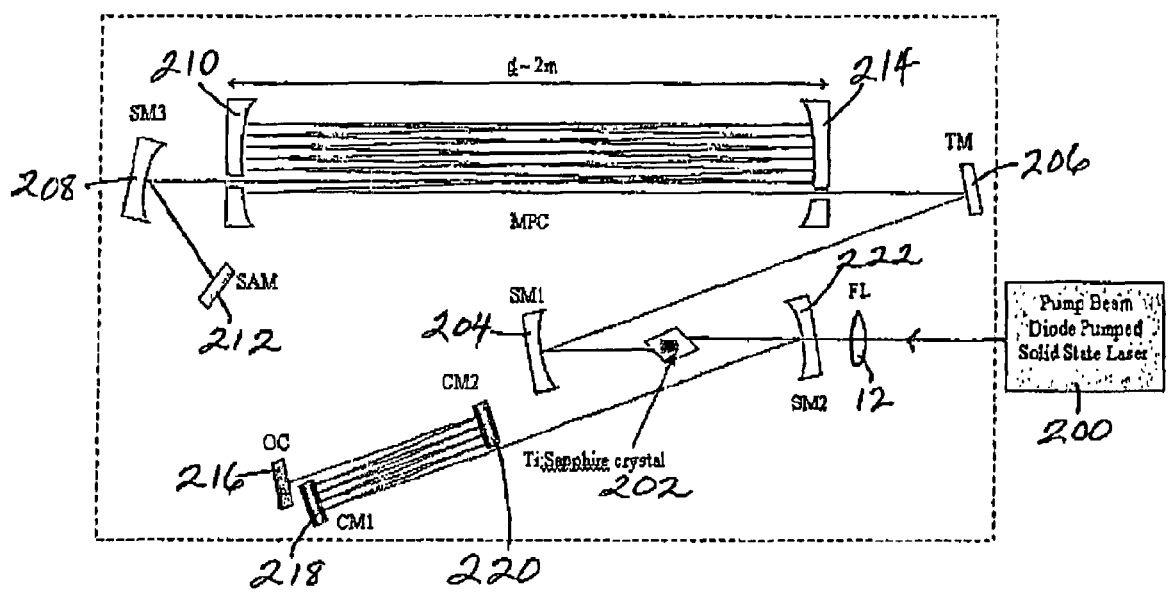
FIG. 5 is a first embodiment of the present invention with a Ti:Sapphire oscillator.

FIG. 5 is a first embodiment of the present invention with a Ti:Sapphire oscillator. In FIG. 5, a pump beam 200 from a diode pumped solid state laser is focused, with focusing lens 12, on a Ti:Sapphire crystal 202 positioned between two spherical mirrors 204 and 222. The spherical mirrors 204, 222 have a radius of approximately 10 centimeters (cm). The light beam resonates inside the cavity formed by the Output Coupler 216 with 12% transmission, and the Saturable Absorber Mirror (SAM) 212. For each path, the light beam goes through the gain medium, through the multipass cell formed by mirrors 210 and 214. The multipass cell is approximately 4 inches in diameter, approximately 2 meters (m) in length with r.o.c., 6.5 mm holes. Light passes through the multipass cell and reflects on the chirped mirrors 218 and 220 each having $-60$ $fs^2$/reflection, and to the SAM 212. A curved mirror 208, with a radius of approximately 50 cm, is used to focus light onto the SAM 212 in order to reach the saturation intensity. A turning mirror 206 is used to steer the beam in order to reduce the laser footprint. The order in which light passes through these elements does not matter.

Figure 6:
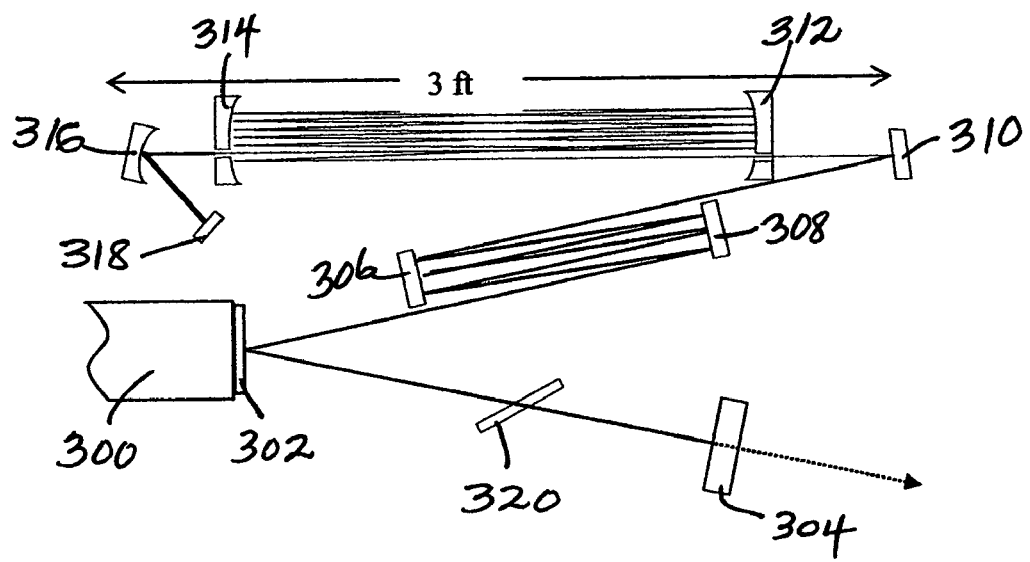
FIG. 6 is a second embodiment of the present invention with a face-pumped Yb:YAG or Yb:KYW thin disk laser configuration.

If the same architecture were utilized with a directly-diode pumped Yb:YAG or Yb:KYW laser, for instance the configuration, and footprint would be much smaller. FIG. 6 shows a laser schematic in a face-pumped Yb:YAG or Yb:KYW thin disk laser configuration. The thin disk laser head 300 acts as the gain medium and as a mirror at the same time. In FIG. 6, the beam path is very similar to that illustrated in FIG. 5, except that it is folded one more time on the thin disk 302, allowing a more compact system.

The light beam resonates inside the cavity formed by the output coupler 304 and a Broadband Saturable Absorber Mirror 318. Each path, the light beam goes through the multipass cell formed by mirror 312 and 314. The multipass cell is approximately 4 inches in diameter, with a length of approximately 3 feet (ft.) with r.o.c., 6.5 mm holes. Light passes through the multipass cell and reflects on dispersion compensated mirrors 306, 308, is reflected by the thin disk 302 through Brewster plate 320, before exiting the output coupler 304. The thin disk geometry also allows better thermal management in the crystal. As a result, the power is scaleable with pump energy, and detrimental effects, such as, thermal lensing is minimized. The invention presented here is particularly appropriate for thin disk lasers.

Figure 7:
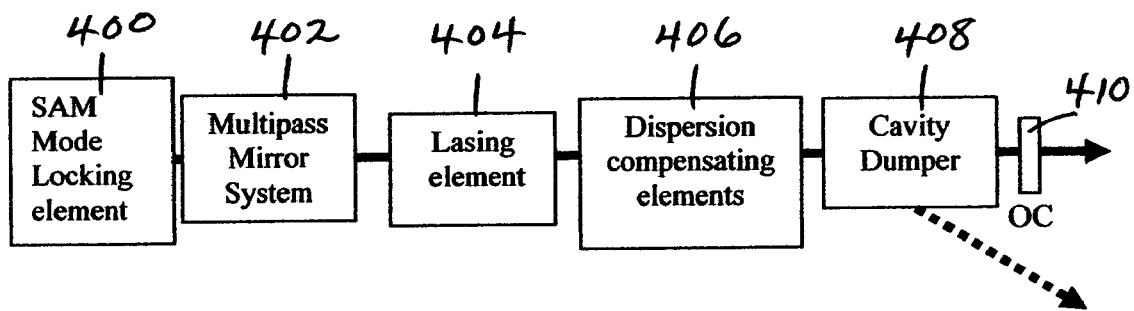
FIG. 7 is a third embodiment of the present invention incorporating a cavity dumper.

FIG. 7 shows the general layout of the novel high intensity mode-locked laser of the present invention with the addition of a cavity dumper 408 between the multi-pass mirror system 402 and the output coupler 410. The cavity dumper 408 facilitates the extraction of all the energy trapped inside the cavity by dumping the beam, using an optical gate that can be either acousto-optically or electro-optically driven. The laser system with the cavity dumper has a several-fold improvement in the usable pulse energy.

Figure 8:
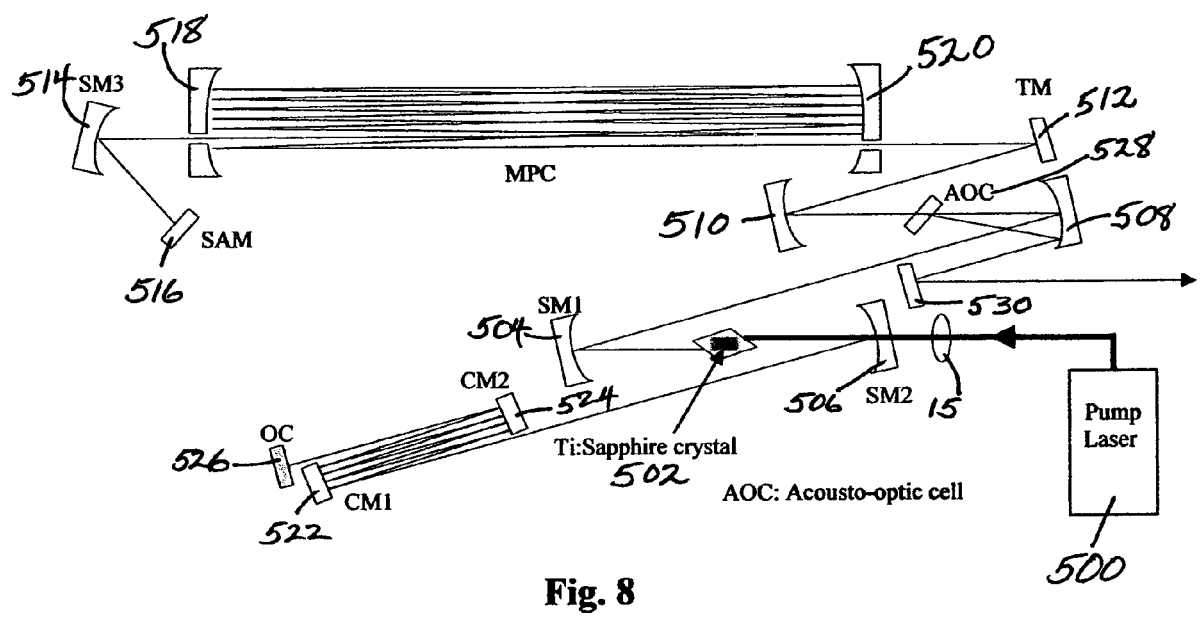
FIG. 8 is a fourth embodiment of the present invention with a Ti:Sapphire crystal and an acousto-optic cell cavity dumping scheme.

Except for the addition of an acousto-optic cell 528 and the addition of spherical mirrors 504, 506 and 514, the laser configuration in FIG. 8 is the same as the diode pumped solid state laser in FIG. 7. FIG. 8 shows a version of this system for a Ti:Sapphire laser using a cavity dumping scheme.

In FIG. 8, a pump laser 500 sends a beam through focusing lens 15 onto a Ti:Sapphire crystal 502 positioned between two spherical mirrors 504 and 506. Thereafter, the light path is very much the same as that depicted in FIG. 5. The light beam resonates inside the cavity formed by the Output Coupler 526 with 12% transmission, and the Saturable Absorber Mirror (SAM) 516. For each path, the light beam goes through the gain medium, to the multipass cell formed by mirrors 518 and 520. The multipass cell is approximately 4 inches in diameter, approximately 2 meters (m) in length with r.o.c., 6.5 mm holes. Light passes through the multipass cell and reflects on the chirped mirrors 522 and 524 each having $-60$ fs$^2$/reflection, and to the SAM 516. A curved mirror 514, with a radius of approximately 50 cm, is used to focus light onto the SAM 516 in order to reach the saturation intensity. A turning mirror 512 is used to steer the beam in order to reduce the laser footprint. The order in which light passes through these elements does not matter. The difference between the light path in FIG. 8 is that every time the acousto-optic cell 528 is triggered, a transient Bragg grating is created in the cell, which deflects the beam outside the cavity. The beam then bypasses the output coupler 526, is picked up by a mirror 530 delivering pulses of higher energy. The curved mirrors 508, 510 are used to focus the beam onto the grating and recollimate it.

Cavity dumping relies on bypassing the output coupler (OC) that has a low transmission coefficient, by dumping inside the Fabry-Perot cavity where most of the energy is located. This is achieved by inserting an acousto-optic cell, in which an acoustic wave creates a Bragg grating that diffracts light. Generation of femtosecond pulses with intensities in the MW range is essential for a number of applications including optical harmonic generation, investigation of ultrafast nonlinear optical phenomena and laser micromachining. The development of low cost, simple and compact laser sources with high pulse energies will enable a wider range of ultrafast laser applications, making this technology more available to both the research and the development communities.

In laser micromachining applications, minimum pulse energy of several 100 s of nano Joules (nJ) is generally required. Consequently, most research studies utilize laser systems typically composed of a laser oscillator followed by an amplification stage, employing chirped pulse amplification schemes. These systems are complex, cost-ineffective and require high pump power levels. We propose, as an alternative, to use the laser system described above for such application and demonstrate its ability to produce ultrashort light pulses, with sufficient energy for micromachining applications.

Figure 9:
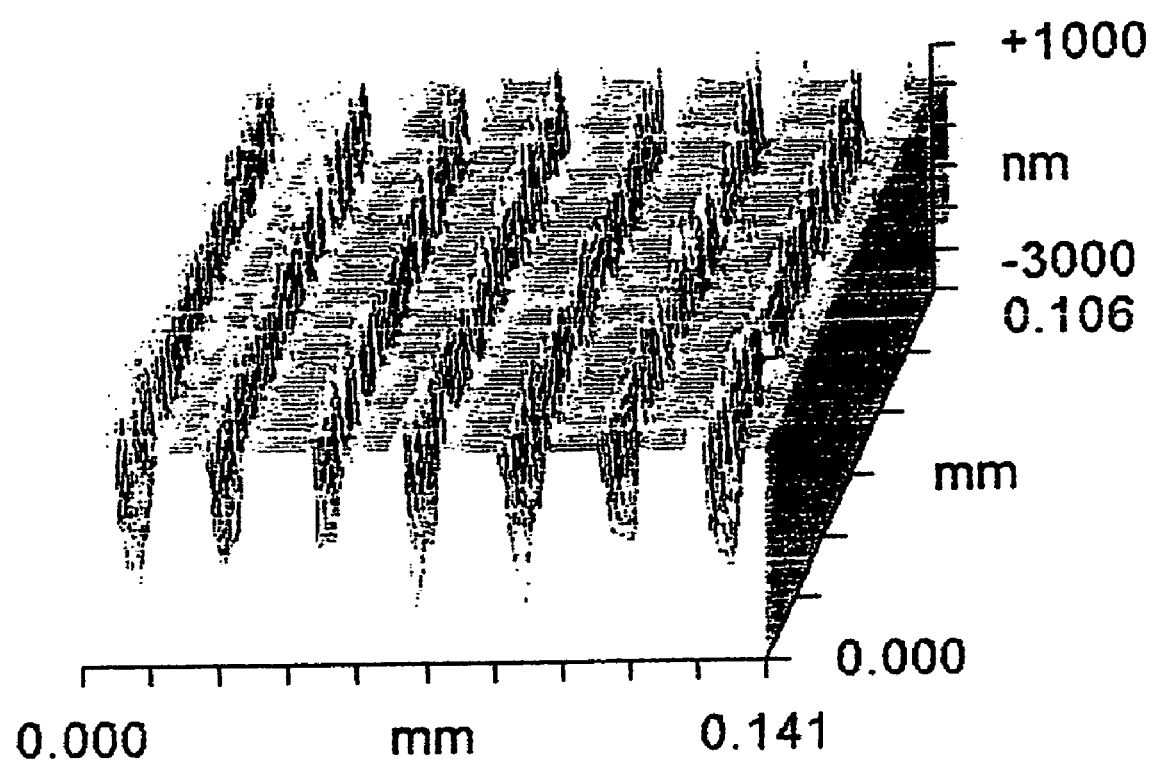
FIG. 9 is a surface profile of laser micro-machined trenches in Arsenic trisulfide (As$_2$S$_3$) using the mode-locked laser of the present invention.

FIG. 9 is a surface profile of laser micro-machined trenches in Arsenic trisulfide ($As_2S_3$) using the mode-locked laser of the present invention. The femtosecond regime minimizes heat disposition and allows the fabrication of fine features measuring less than approximately 10 microns.

FIG. 9 shows the surface profile of laser micromachined trenches in Arsenic trisulfide using pulse energies of approximately 20 nJ (image taken with an interferometric microscope Zygo New View 5000).

Figure 10:
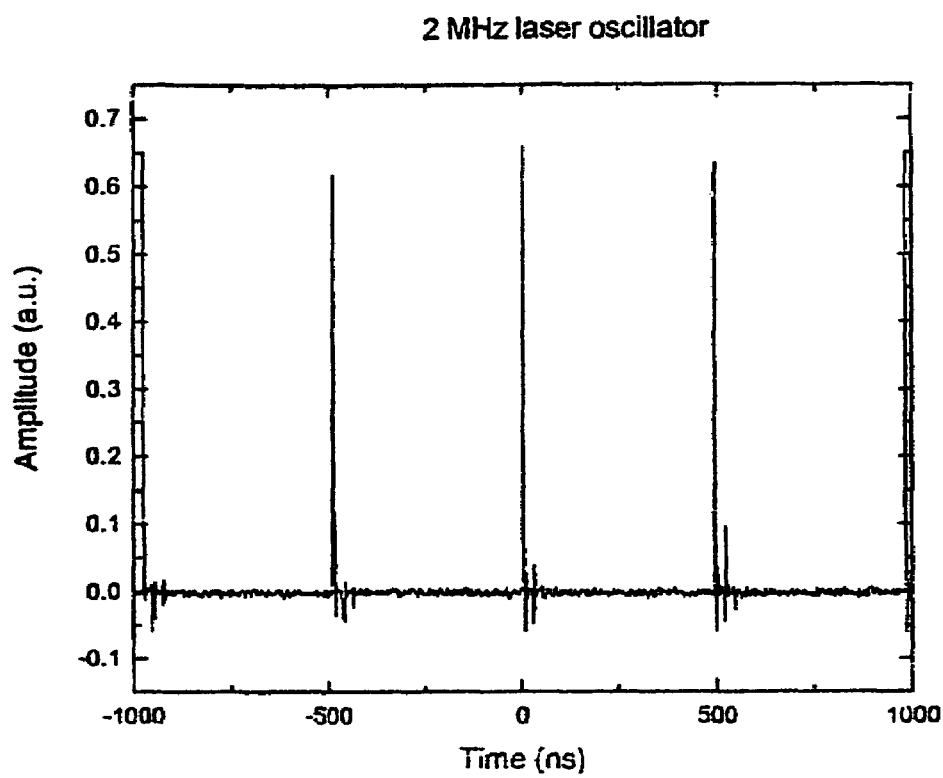
FIG. 10 is an oscilloscope trace of a 2-MHz laser pulse train, having a pulse separation of approximately 500 nanoseconds (ns).

FIG. 10 is an oscilloscope trace of a 2-MHz laser pulse train, having a pulse separation of approximately 500 nanoseconds (ns).

Figure 11:
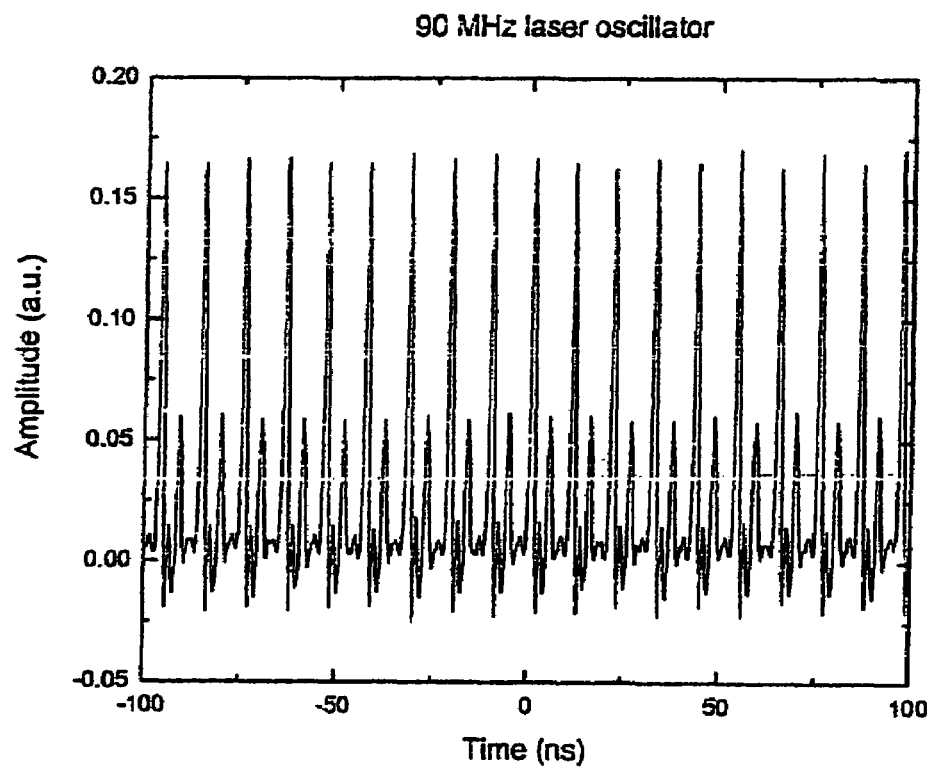
FIG. 11 is an oscilloscope trace of a standard 90-MHz laser pulse train, having a pulse separation of approximately 10 nanoseconds (ns).

In addition to an increase of the pulse energy, lowering the repetition rate minimizes damage problems associated with the thermal load accumulated pulse after pulse. The insertion of the multipass cell increases with time separation between each pulse, leaving more time to the material to recover from the previous pulse. Recovery time artifacts are thus avoided. This is illustrated by FIG. 10 showing the oscilloscope trace of a 2-MHz laser pulse train having a pulse separation of approximately 500 ns. In comparison, a standard 90-MHz laser, shown in FIG. 11, has a pulse separation of approximately 10 ns. FIG. 11 is an oscilloscope trace of a standard 90-MHz laser pulse train, having a pulse separation of approximately 10 nanoseconds (ns).

The advantages of the invention are less cost, more versatile laser equipment, greatly increased ruggedness, ease of manufacture and compatibility with both disk laser and diode pumped solid-state laser.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A compact, high intensity megahertz (MHz) mode-locked laser, the laser consisting of:
    a laser source for producing a light beam coupled to a resonator cavity having a gain medium, the gain medium selected from the group consisting of Yb:KYW, a KY[WO$_4$]$_2$ (KYW) crystal doped with Ytterbium ions, Yb:YAG, a Y$_3$Al$_5$O$_{12}$ (YAG) crystal doped with Ytterbium ions, and Ti:Sapphire, a sapphire (Al$_2$O$_3$) crystal doped with Titanium ions, the resonator cavity consisting essentially of:
    a saturable absorber mirror in the resonator cavity for self-starting and stable mode-locking operation;
    a multipass mirror system having only a first mirror and second mirror, each of the first and second mirror having only one hole, in combination with the saturable absorber mirror in the resonator cavity for lowering repetition rate of the laser system to below approximately 50 megahertz (MHz), the first mirror and the second mirror aligned to allow the light beam to enter through the one hole in the first mirror to reflect plural times within the multipass mirror system and exit through the one hole in the second mirror;
    dispersion compensating element in the resonator cavity for dispersion compensation; and
    an output coupler to the laser for releasing pulses with intensities in a range between approximately 1 Mega- Hertz (MHz) and approximately 50 MegaHertz (MHz), and having an energy of between approximately 10 nano Joules (nJ) and approximately 150 nano Joules (nJ) for micro-machining and micro-structuring applications, the light beam resonating inside the resonator cavity formed by the output coupler and the saturable absorber mirror.

2. The laser of claim 1 wherein the laser source includes a diode laser source.

3. The laser of claim 1 wherein the multi-pass mirror slows down the repetition rate of laser pulses to between approximately 1 MHz to approximately 50 MHz.

4. A compact, high intensity megahertz (MHz) mode-locked laser, the laser consisting essentially of:
   a laser source for producing a light beam coupled to a resonator cavity having a gain medium, the gain medium selected from the group consisting of Yb:KYW, a KY[WO$_4$]$_2$ (KYW) crystal doped with Ytterbium ions, Yb:YAG, a Y$_3$Al$_5$O$_{12}$ (YAG) crystal doped with Ytterbium ions, and Ti:Sapphire, a sapphire (Al$_2$O$_3$) crystal doped with Titanium ions, the resonator cavity consisting essentially of:
   a saturable absorber mirror in the resonator cavity for self-starting and stable mode-locking operation;
   a multipass mirror system having a first mirror and second Mirror in combination with the saturable absorber mirror in the resonator cavity for lowering repetition rate of the laser system to below approximately 50 megahertz (MHz), the first mirror and the second mirror aligned to allow the light beam to reflect plural times within the multipass mirror system;
   dispersion compensating element in the resonator cavity for dispersion compensation;
   an output coupler to the laser for releasing pulses with intensities in a range between approximately 1 MegaHertz (MHz) and 50 MegaHertz (MHz), and having an energy of between approximately 10 nano Joules (nJ) and approximately 150 nano Joules (nJ), sufficient for micro-machining and micro-structuring applications, the light beam resonating inside the resonator cavity formed by the output coupler and the saturable absorber mirror; and
   a cavity dumping component for extracting energy trapped inside of the resonant cavity.

5. The laser of claim 4 wherein the cavity dumping component is an optical gate located between the output coupler and the saturable absorber mirror.

6. The laser of claim 5 wherein the cavity dumping component is an acousto-optically driven gate.

7. The laser of claim 5 wherein the cavity dumping component is an electro-optically driven gate.

8. A method of improving the pulse energy of a compact, high intensity megahertz mode-locked laser consisting of the steps of:
   (a) providing a resonant laser cavity having a saturable absorber mirror and a multipass cell formed by only one first and only one second mirror, each of the first and the second mirror having only one hole to allow a light beam from a laser source to enter and exit, and a laser gain medium, the gain medium selected from the group consisting of Yb:KYW, a KY[WO$_4$]$_2$ (KYW) crystal doped with Ytterbium ions, Yb:YAG, a Y$_3$Al$_5$O$_{12}$ (YAG) crystal doped with Ytterbium ions, and Ti:Sapphire, a sapphire (Al$_2$O$_3$) crystal doped with Titanium ions;
   (b) passing a light beam through the gain medium and the multipass cell during each pass of the light beam inside the resonator laser cavity formed by the output coupler and the saturable absorber mirror, the light beam entering the multipass cell though the one hole in the first mirror, reflecting plural times within the multipass cell and exiting the multipass cell through the only one hole in the second mirror;
   (c) positioning a cavity dumping component within the laser cavity between an output coupler and the saturable absorber;
   (d) pumping the laser gain medium;
   (e) extracting energy trapped inside the cavity by dumping excess energy through an optical gate; and
   (f) outputting femtosecond pulses with intensities in a range between approximately 1 MegaHertz (MHz) and approximately 50 MegaHertz (MHz), and having an energy of between approximately 10 nano Joules (nJ) and approximately 150 nano Joules (nJ).

9. The method of claim 8 wherein the optical gate is acousto-optically driven.

10. The method of claim 8 wherein the optical gate is electro-optically driven.

11. The method of claim 8 wherein the saturable absorber is a broadband saturable absorber.

12. A method of providing low cost, simple, compact, ultrafast laser with high pulse energies for micromachining applications, consisting of the steps of:
   (a) providing a laser configuration having a laser gain medium, a resonator cavity, a saturable absorber mirror, a multipass mirror cell having only one first and only one second mirror, each mirror having only one hole therethrough and an output coupler, the gain medium selected from the group consisting of Yb:KYW, a KY[WO$_4$]$_2$ (KYW) crystal doped with Ytterbium ions, Yb:YAG, a Y$_3$Al$_5$O$_{12}$ (YAG) crystal doped with Ytterbium ions, and Ti:Sapphire, a sapphire (Al$_2$O$_3$) crystal doped with Titanium ions;
   (b) resonating a light beam inside the cavity formed by the saturable absorber mirror and the output coupler;
   (c) passing the light beam into the multipass mirror cell through the only one hole in the first mirror, reflecting the light beam plural times within the multipass mirror cell for lowering a repetition rate of the laser system, the light bean exiting the multipass mirror cell through the only one hole in the second mirror;
   (d) pumping the laser gain medium;
   (e) generating femtosecond pulses with intensities in a range between approximately 1 MegaHertz (MHz) and approximately 50 MegaHertz (MHz), and having an energy of between approximately 10 nano Joules (nJ) and approximately 150 nano Joules (nJ); and
   (f) simultaneously lowering the repetition rate of each pulse, thereby minimizing damage associated with the thermal load accumulated pulse after pulse.

13. A high intensity megahertz (MHz) mode-locked laser system, the laser system consisting essentially of:
   a laser source and a gain medium, the gain medium selected from a group consisting of a Ti:Sapphire crystal and a thin disk-shaped gain medium;
   a saturable absorber mirror in the system for self-starting and stable mode-locking operation;
   a multipass mirror cell having a first mirror and a second mirror aligned with the first mirror in the laser system, each of the first and the second mirrors having only one hole to allow a light beam from the laser source to enter and exit, respectively, the light beam reflecting plural times within the multipass mirror cell for lowering a repetition rate of the laser system to below approximately 50 megahertz (MHz);

a dispersion compensating element in the laser system for dispersion compensation; and an output coupler to the laser system for releasing pulses with intensities in a range between approximately 1 MegaHertz (MHz) and approximately 50 MegaHertz (MHz), and having an energy of between approximately 10 nano Joules (nJ) and approximately 150 nano Joules (nJ) for micro-machining and micro-structuring applications.

14. A laser system, consisting essentially of:

a lasing element, the lasing element including a resonator cavity having a gain medium, the gain medium selected from the group consisting of Yb:KYW, a $KY[WO_4]_2$ (KYW) crystal doped with Ytterbium ions, Yb:YAG, a $Y_3Al_5O_{12}$ (YAG) crystal doped with Ytterbium ions, and Ti:Sapphire, a sapphire ($Al_2O_3$) crystal doped with Titanium ions;

dispersion compensating elements coupled to the lasing element;

a SAM mode-locking element coupled to the dispersion compensating element; and a multipass mirror system consisting of a first mirror and a second mirror aligned with the first mirror and separated by a distance, each of the first and second mirror having one single hole therethrough coupled to the SAM mode-locking element; and an output coupler coupled to the multipass mirror system for providing an output from the laser system with intensities in a range between approximately 1 MegaHertz (Mhz) and approximately 50 MegaHertz (Mhz) and having an energy of between approximately 10 nano Joules (nJ) and approximately 150 nano Joules (nJ).

15. A laser system, comprising:

a lasing element, the lasing element including a resonator cavity having a gain medium, the gain medium selected from the group consisting of Yb:KYW, a $KY[WO_4]_2$ (KYW) crystal doped with Ytterbium ions, Yb:YAG, a $Y_3Al_5O_{12}$ (YAG) crystal doped with Ytterbium ions, and Ti:Sapphire, a sapphire ($Al_2O_3$) crystal doped with Titanium ions;

dispersion compensating elements coupled to the lasing element;

a SAM mode-locking element coupled to the dispersion compensating element; and a multipass mirror system coupled to the SAM mode-locking element, the multipass mirror system consisting of a first mirror and a second mirror aligned with the first mirror, each of the first and second mirror having one single hole therethrough to allow a light beam from the lasing element to enter the multipass mirror system through the one hole, the light beam reflecting plural times within the multipass mirror system before exiting through an opposite hole;

a cavity dumper coupled to the multipass mirror system; and an output coupler coupled to the cavity dumper for providing an output from the laser system, with intensities in a range between approximately 1 MegaHertz (MHz) and approximately 50 MegaHertz (MHz), and having an energy of between approximately 10 nano Joules (nJ) and approximately 150 nano Joules (nJ), the laser cavity formed by the SAM mode-locking element and the output coupler.

* * * * *